United States Patent [19]

Warner

[11] 4,091,916
[45] May 30, 1978

[54] APPARATUS FOR DRIVING INDIVIDUAL ROLLERS OF A POWER CONVEYER

[75] Inventor: Kent F. Warner, White Plains, N.Y.

[73] Assignee: W & H Conveyor Systems, Inc., Carlstadt, N.J.

[21] Appl. No.: 730,985

[22] Filed: Oct. 8, 1976

[51] Int. Cl.² .............................................. B65G 13/02
[52] U.S. Cl. ....................................... 198/790; 248/291
[58] Field of Search ................ 198/787, 789, 790; 248/220.3, 222.1, 242, 291, 222.3, 220.4, 222.4

[56] References Cited

U.S. PATENT DOCUMENTS

| 2,002,830 | 5/1935 | Pevear | 198/787 |
| 2,129,510 | 9/1938 | Taylor | 198/787 |
| 3,015,897 | 1/1962 | Hopp | 248/222.1 |
| 3,323,636 | 6/1967 | Gotham | 198/790 |
| 3,501,015 | 3/1970 | Behles | 248/220.4 |
| 3,967,718 | 7/1976 | Monahan | 198/790 |

FOREIGN PATENT DOCUMENTS

| 567,808 | 12/1932 | Germany | 198/790 |
| 20,476 of | 1915 | United Kingdom | 248/242 |

Primary Examiner—Evon C. Blunk
Assistant Examiner—Joseph E. Valenza
Attorney, Agent, or Firm—Eugene E. Geoffrey, Jr.

[57] ABSTRACT

Apparatus for driving rollers of a powered conveyor which includes a bracket pivoted at the upper end to the conveyor frame and having an adjusting screw at the lower end. A pressure roller carried by the bracket engages the belt and when adjusting screw is rotated to spring the bottom of the bracket away from the frame, the pressure roller is pushed upwardly to urge the belt against the conveyor roller.

6 Claims, 6 Drawing Figures

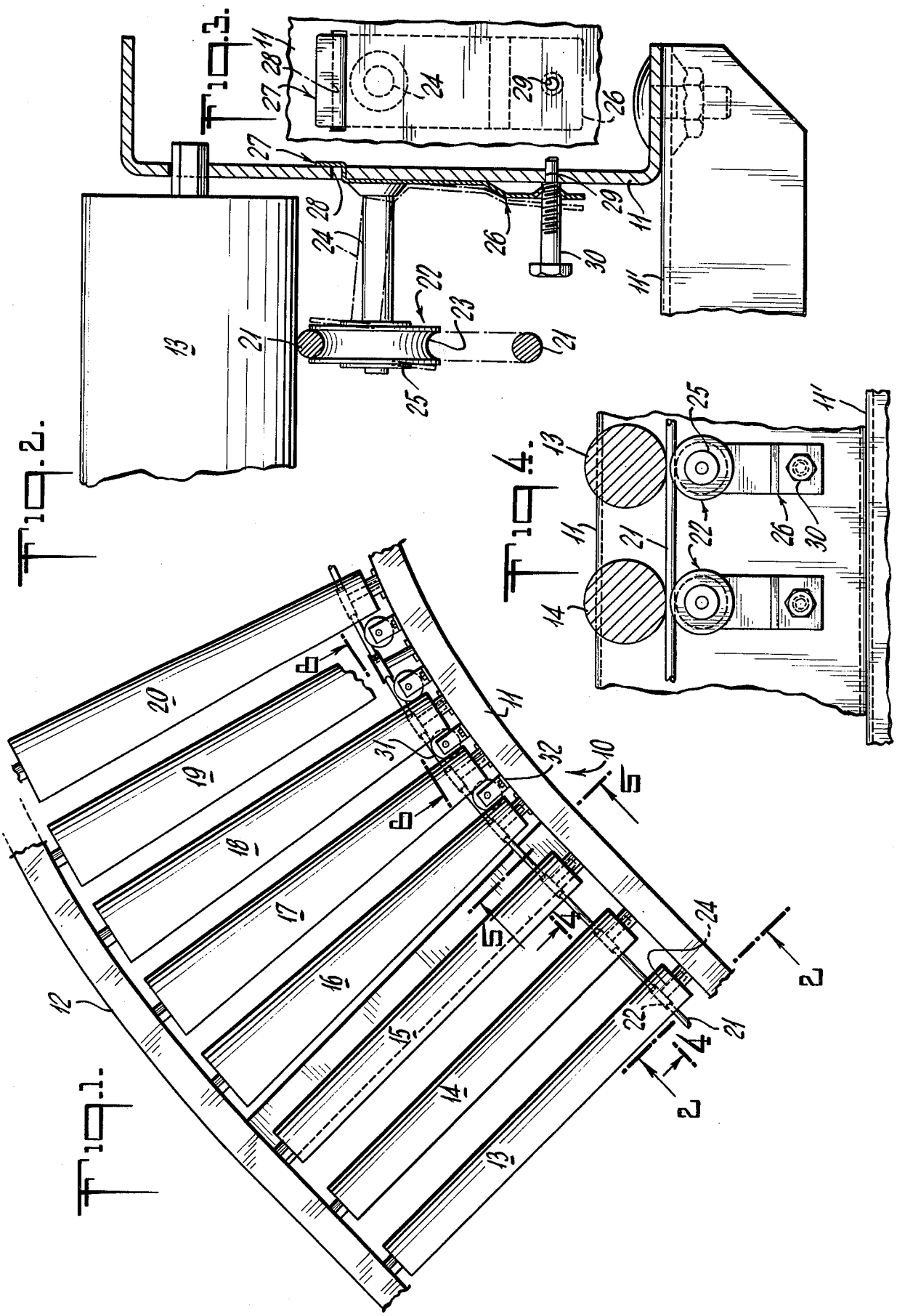

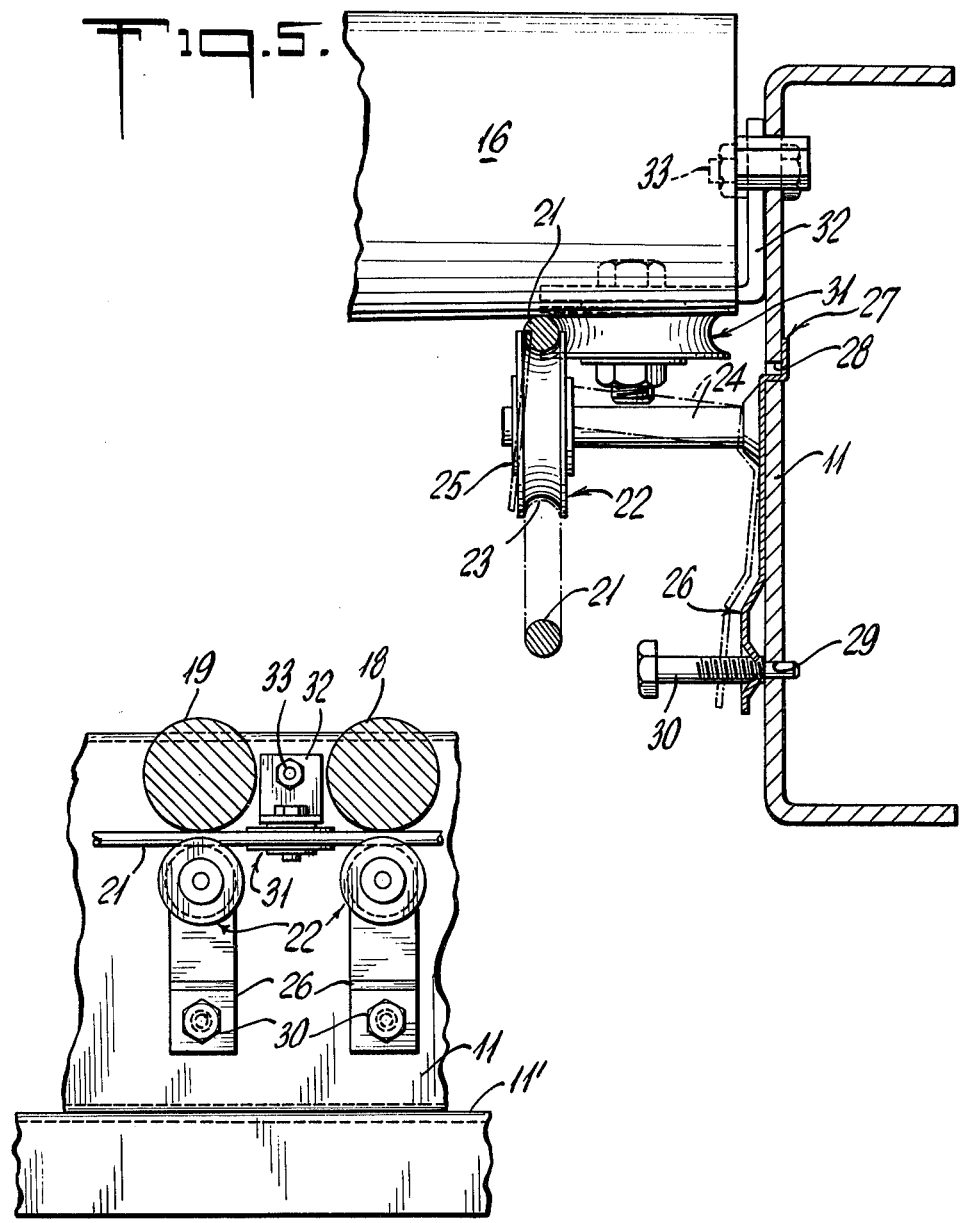

APPARATUS FOR DRIVING INDIVIDUAL ROLLERS OF A POWER CONVEYER

DESCRIPTION OF THE INVENTION

This invention relates to a power conveyor which utilizes a plurality of rollers which are driven by a belt disposed beneath the rollers and more specifically to a novel and improved structure for urging the driven belt against the underside of the rollers and for controlling the pressure between the belt and each of said rollers.

Power driven roller conveyors have taken a variety of forms, but one of the more well known procedures is to provide at least one endless belt extending along the length of at least one section of the conveyor and carried by a pair of rollers or pulleys as the case may be, at least one of which is driven. Means were then provided for urging the top portion of the belt against the underside of one or more of the conveyor rollers in order to drive the rollers. A variety of systems have been utilized to urge the belt in contact with the rollers but have not been found entirely satisfactory both from the standpoint of complication as well as cost. Furthermore, in order to obtain relatively precise control of the pressure expensive configurations were required.

This invention provides a novel and improved structure for urging a belt into contact with a roller to be driven thereby which is characterized by its simplicity, relatively low cost and ease with which pressure can be controlled.

Still another object of the invention resides in the provision of a novel and improved roller for roller conveyors which can be quickly and easily installed and at the same time affords means for precisely regulating the pressure of a belt against the underside of a conveyor roller.

Still another object of the invention resides in the provision of novel and improved means for powering roller conveyors.

The objects of the invention are attained through the provision of a bracket effectively hinged to the side frame of a roller conveyor and carrying a roller or grooved pulley which bears against the underside of a driven belt and urges it into contact with a roller. Means are provided for modifying the angle of the hinged support in order to control the pressure at which the roller bears against the underside of the belt and urges it into contact with the conveyor or roller.

The above and other objects and advantages of the invention will become more apparent following description and accompanying drawings forming part of this application.

In the drawings,

FIG. 1 is a plan view of a roller conveyor showing the invention as applied to both straight and curved sections, FIG. 2 is a cross-sectional view of FIG. 1 taken along the line 2—2 thereof, FIG. 3 is a fragmentary elevational view of FIG. 2 taken along the line 3—3 thereof, and FIGS. 4, 5 and 6 are cross-sectional views of FIG. 1 taken along the lines 4—4, 5—5 and 6—6 thereof.

Referring now to the drawings the conveyor generally denoted by the numeral 10 is of conventional construction in that it is provided with a pair of U-shaped channels 11 and 12 for rotatably supporting a plurality of rollers such as the rollers 13 through 20. The channels 11 and 12 are in turn supported by transverse beams 11'. The rollers 13, 14 and 15 form part of a straight section of the conveyor while the rollers 16 through 20 are tapered and are used in the curved portion of the conveyor.

The rollers 13 through 20 are driven by an endless belt 21 of which only the upper portion has been illustrated. The belt in the instant embodiment of the invention is a circular cross-section and would be supported at the ends by suitable pulleys at least one of which would be driven. It will become apparent, however, as the description proceeds that the cross-sectional configuration of the belt 21 may be flat or of any other suitable shape. Each of the rollers 13 through 20 is driven by applicant's novel and improved structure which urges the belt 21 against the underside of the rollers and this is illustrated more clearly in FIGS. 2 through 4.

The pressure roller denoted by the numeral 22 has a peripheral groove 23 conforming to the configuration of the belt 21 and is carried by a shaft 24 and a suitable bearing 25 is utilized to mount the roller 22 on the shaft 24.

The shaft 24 is carried by a bracket 26 preferably of a resilient material which has an upper off-set or L-shaped portion 27 which engages an elongated slot 28. The bracket 26 is placed in position by tilting the bottom portion upwardly in order to enable the L-shaped portion to engage the slot 28 whereupon it is merely lowered into the position shown in solid lines in FIG. 2. The shaft 24 may be riveted, welded or otherwise secured to the upper portion of the bracket 26 so that when the latter lies flat against the channel 11 as illustrated in FIG. 2, the shaft 24 is generally parallel to the axis of the roller 13 and little if any pressure is exerted on the belt 21 in order to urge it into engagement with the roller 13. Furthermore, inasmuch as the bracket 26 has substantial width and the slot 28 is of equivalent width the bracket cannot shift materially from its vertically disposed position. However, if desired, the channel 11 may include a hole 29 to receive the reduced diameter of the inner end of the adjusting screw 30 to further prevent any shifting of the bracket 26.

With the foregoing arrangement the pressure of the belt 21 on the underside of a roller such as the roller 13 can be readily modified by merely adjusting the screw 30 since it threadably engages an opening in the lower portion of the support 26. This action moves the support outwardly as for instance to the dotted line position shown in FIG. 2 and urges the roller 22 upwardly to increase the pressure. In this way the pressure on each of the rollers can be modified as desired.

The invention as described above is equally applicable to curve sections such as the section of the conveyor shown in FIG. 1 which includes rollers 16 through 20. For this purpose, a structure such as that shown in FIGS. 5 and 6 may be employed.

More specifically and with reference to FIGS. 5 and 6, it will be observed that the structure for urging the belt 21 against the rollers such as the rollers 18 and 19 is identical to that previously described and accordingly like numerals have been utilized to denote like components. Inasmuch as the belt 21 must move through an arcuate path, a plurality of guide rollers 31 are disposed between successive rollers 16 through 20 are mounted on the channel 11 by angle brackets 32 bolted to the channel by suitable bolts or other fastening means 33 and carrying the guide rollers 31 in a horizontal position as shown more clearly in FIG. 5. These guide rollers will therefore guide the belt 21 in the arcuate path and also maintain the belt in position to be engaged by the pressure adjusting rollers 22.

It is evident from the foregoing that the pressure adjusting mechanism is equally effective on both straight conveyor sections as well as curved sections and furthermore precise pressure adjustments can be readily obtained merely by rotating an adjusting screw. In certain applications it may not be necessary to drive each of the successive rollers on a conveyor and thus the pressure adjusting rollers 22 may be utilized only on selected rollers.

While only certain embodiments of the invention have been illustrated and described, it is understood that alterations, changes and modifications may be made without departing from the true scope and spirit thereof.

What is claimed is:

1. In a powered conveyor having a plurality of rollers carried by a frame and an endless driven belt disposed beneath the rollers, means for urging one section of said belt against at least certain of said rollers, said means each comprising a bracket pivotally attached to said frame and having means for modifying the tilt of the bracket relative to the frame, and a pressure roller carried by said bracket and engaging said belt on the side opposite said conveyor roller, said tilt modifying means adjusting the pressure at which said belt is urged against the associated conveyor roller, said pivotal attachment including an L-shaped offset portion on said bracket and said frame includes an elongated slot receiving said offset portion and pivotally retaining said bracket in position when said bracket is in close proximity to said frame.

2. In a powered conveyor according to claim 1 wherein said bracket tilting means includes a screw threadably engaging said bracket at a distance from said pivot and bearing against said frame whereby rotation of said screw will modify the pressure of the belt against the associated conveyor roller.

3. In a powered conveyor according to claim 2 wherein said screw has an end portion of reduced diameter and said frame includes a hole for rotatably receiving said end portion of said screw.

4. In a powered conveyor according to claim 1 wherein said pressure roller is carried by a support fixed to said bracket and extending outwardly therefrom.

5. In a powered conveyor according to claim 1 wherein belt guide rollers are positioned between conveyor rollers to guide said belt in an arcuate path on curved conveyor sections and maintain said belt in engagement with said pressure rollers.

6. In a powered conveyor having a plurality of rollers carried by a frame having a vertical portion and an endless driven belt disposed beneath the rollers, means for urging one section of said belt against at least certain of said rollers, said means each comprising an elongated bracket lying against and pivotally attached at one end to said vertical frame portion and having means at the other end for modifying the tilt of the bracket relative to the plane of the vertical frame portion, said pivotal attachment including an elongated opening on said frame, said bracket having an offset portion connected with and displaced parallel to the plane of the main portion of said bracket, said offset portion and its connection engaging said opening to retain the bracket in position on said frame and a pressure roller carried by an arm extending from said bracket and positioned beneath one of said conveyor rollers, said pressure roller engaging said belt on the side opposite the last said conveyor roller, said tilt modifying means modifying the inclination of said bracket relative to said vertical frame portion and adjusting the pressure at which said belt is urged against the associated conveyor roller.

* * * * *